United States Patent [19]
Ohtsuki

[11] Patent Number: 4,993,913
[45] Date of Patent: Feb. 19, 1991

[54] ROBOT FOR A WORK ON A WALL SURFACE

[75] Inventor: Shigeru Ohtsuki, Tokyo, Japan

[73] Assignee: Nihon Biso Kabushiki Kaisha, Tokyo, Japan

[21] Appl. No.: 378,407

[22] Filed: Jul. 11, 1989

[30] Foreign Application Priority Data

Jul. 15, 1988 [JP] Japan .................. 63-176295

[51] Int. Cl.$^5$ .................. B25T 5/04
[52] U.S. Cl. .................. 414/729; 180/901; 212/211; 901/1; 901/41
[58] Field of Search .................. 414/729, 11; 180/901, 180/164; 212/211; 114/222; 901/1, 16, 29, 41

[56] References Cited

U.S. PATENT DOCUMENTS

| | | | |
|---|---|---|---|
| 3,991,842 | 11/1976 | Larsen | 180/901 X |
| 4,229,136 | 10/1980 | Panissidi | 901/16 X |
| 4,637,494 | 1/1987 | Iida et al. | 901/1 X |
| 4,674,949 | 6/1987 | Kroczynski | 180/901 X |
| 4,688,984 | 8/1987 | Nakashima et al. | 901/29 X |

Primary Examiner—Robert J. Spar
Assistant Examiner—Donald W. Underwood
Attorney, Agent, or Firm—Hedman, Gibson, Costigan & Hoare

[57] ABSTRACT

A robot for a work on a wall surface comprises a main module, which is constructed of, for example, a moving scaffold, hung by ropes and being capable of moving vertically and horizontally to a desired position on a wall surface, an arm module mounted on the main module and being movable with one or more degrees of freedom with respect to the wall surface, and a wrist module mounted on the foremost end portion of the arm module, having one or more degrees of freedom necessary for the work and including an automatic tool changer for detachably mounting a tool necessary for the work on the wrist module. In one aspect of the invention, fixing devices are provided on both sides of the main module and an exchangeable fixing tool is also detachably mounted on the automatic tool changer for stabilizing the main module during work and moving from one place to another.

4 Claims, 5 Drawing Sheets

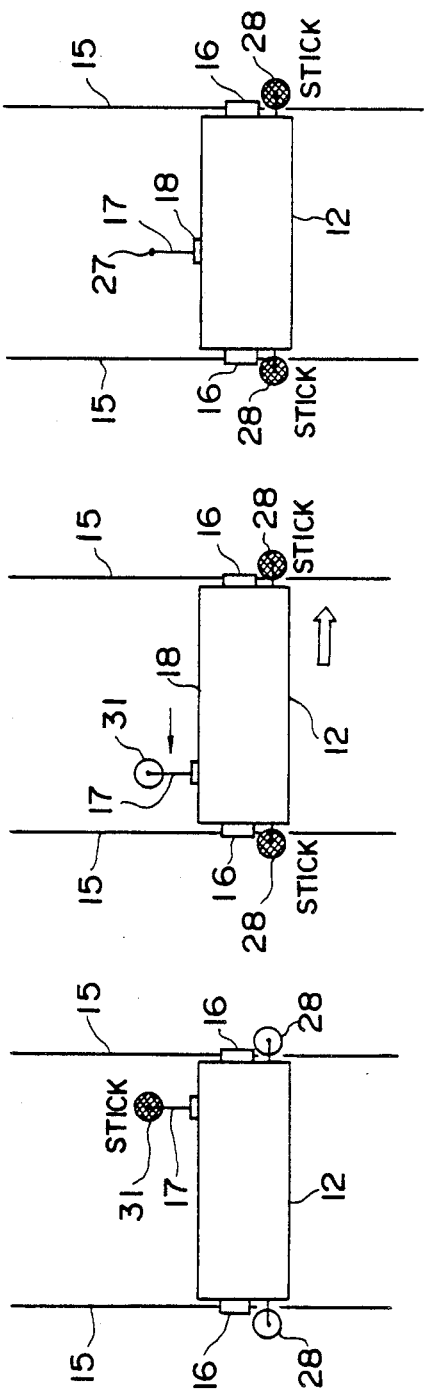
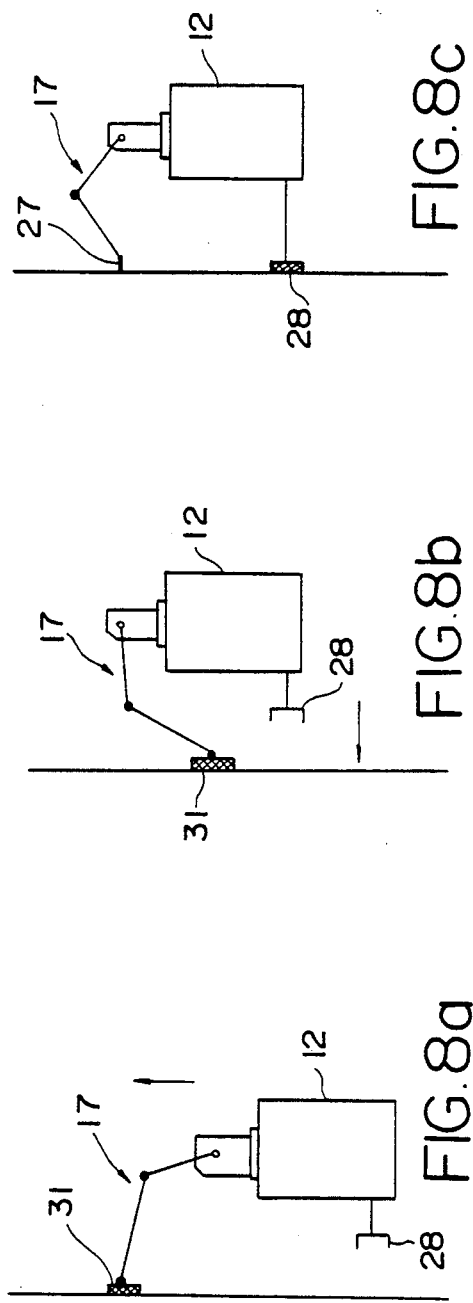

ROBOT FOR A WORK ON A WALL SURFACE

BACKGROUND OF THE INVENTION

This invention relates to a robot for a work on a wall surface of a building or other structure. The robot is particularly suitable for use on a wall surface at an elevated location. In this robot, a moving scaffold or gondola which is hung by wire ropes is used as a main module and moduled arm and wrist which are required for the work are combined with the main module.

In structures such a buildings, power stations, tanks, chimneys and bridges, cleaning and repair works on outer wall surfaces of these structures become often necessary after building of these structures.

These works are conventionally performed by workmen working in a moving scaffold which is hung by wire ropes from the roof of a building. For doing a limited type of work such as window cleaning, a specialized robot for exclusively doing this work has recently been developed and is replacing manual labor by workmen.

In a coating work made on a wall surface of a structure, it is a general procedure to inspect wall surface conditions first, then clean the wall surface and thereafter spray-coat the wall surface. Only a part of this series of work, e.g., inspection of wall surface conditions or cleaning of wall surface, is replaced by a machine such as a wall surface inspecting robot or a wall surface cleaning robot but there is currently no machine capable of performing all of the series of work performed on the wall surface so that development of a work machine such as a robot in this field is desirable.

The prior art specialized robot for doing window cleaning or wall surface inspection is designed in conformity to a wall surface configuration of a structure to be on and, accordingly, such specialized robot is not only unable to do other works but is unable to be used in other structures by moving the robot to such other structures.

It is, therefore, an object of the invention to provide a robot for a work on a wall surface capable of being used for all types of works performed on a wall surface and also capable of being carried to any desired structure.

SUMMARY OF THE INVENTION

The robot for a work on a wall surface achieving the above object of the invention comprises a main module hung by ropes and being capable of moving vertically and horizontally to a desired position on a wall surface, an arm module mounted on the main module and being movable with one or more degrees of freedom with respect to the wall surface, and a wrist module mounted on the foremost end portion of the arm module, having one or more degrees of freedom necessary for the work and including an automatic tool changer which is capable of detachably mounting a tool necessary for the work on the wrist module.

According to the invention, respective components of the robot are made of a moduled design so that a suitable component can be attached or detached as required whereby the robot can be used for all types of work.

Further, according to the invention, the robot can not only move to any desired location on a wall surface to be worked on by moving the main module but also perform all types of work on the wall surface by attaching the arm module having one or more degrees of freedom to the main module and further combining this arm module with the wrist module.

In one aspect of the invention, there is provided a robot having a the above described feature and further comprising fixing devices provided on the main module for fixedly holding the main module on the wall surface and an exchangeable fixing tool detachably mounted on the automatic tool changer of the wrist module for stabilizing the main module during moving thereof.

Since the fixing means are provided in the main module and the exchangeable fixing tool is attached to the wrist module, the posture of the robot can be stabilized by the fixing means during work by using the wrist module whereas the robot can be moved from one location to another safely by cooperation between the fixing means and the exchangable fixing tool during moving of the robot.

According to the invention, a conventional moving scaffold or gondola can be used as the main module whereby a work on a wall surface at an elevated location can be performed by using a robot of a simplified design and labor can thereby be saved.

Since the robot can be controlled in conformity to projections and recesses formed on the wall surface, the robot can be used for various purposes and, besides, the robot can be moved in a very simple manner to other places where work must be performed.

BRIEF DESCRIPTION OF THE DRAWINGS

In the accompanying drawings,

FIGS. 1 to 5 show an embodiment of the robot for a work on a wall surface according to the invention in which FIG. 1 is a perspective view of the robot;

FIG. 2 is a front view thereof;

FIG. 3 is a side elevation thereof;

FIG. 4 is a plan view thereof;

FIG. 5 is an exploded perspective view of the wrist module of the robot;

FIGS. 7 and 8 are diagrams showing schematically horizontal and vertical movements of the robot;

DESCRIPTION OF PREFERRED EMBODIMENTS

Figure 1:
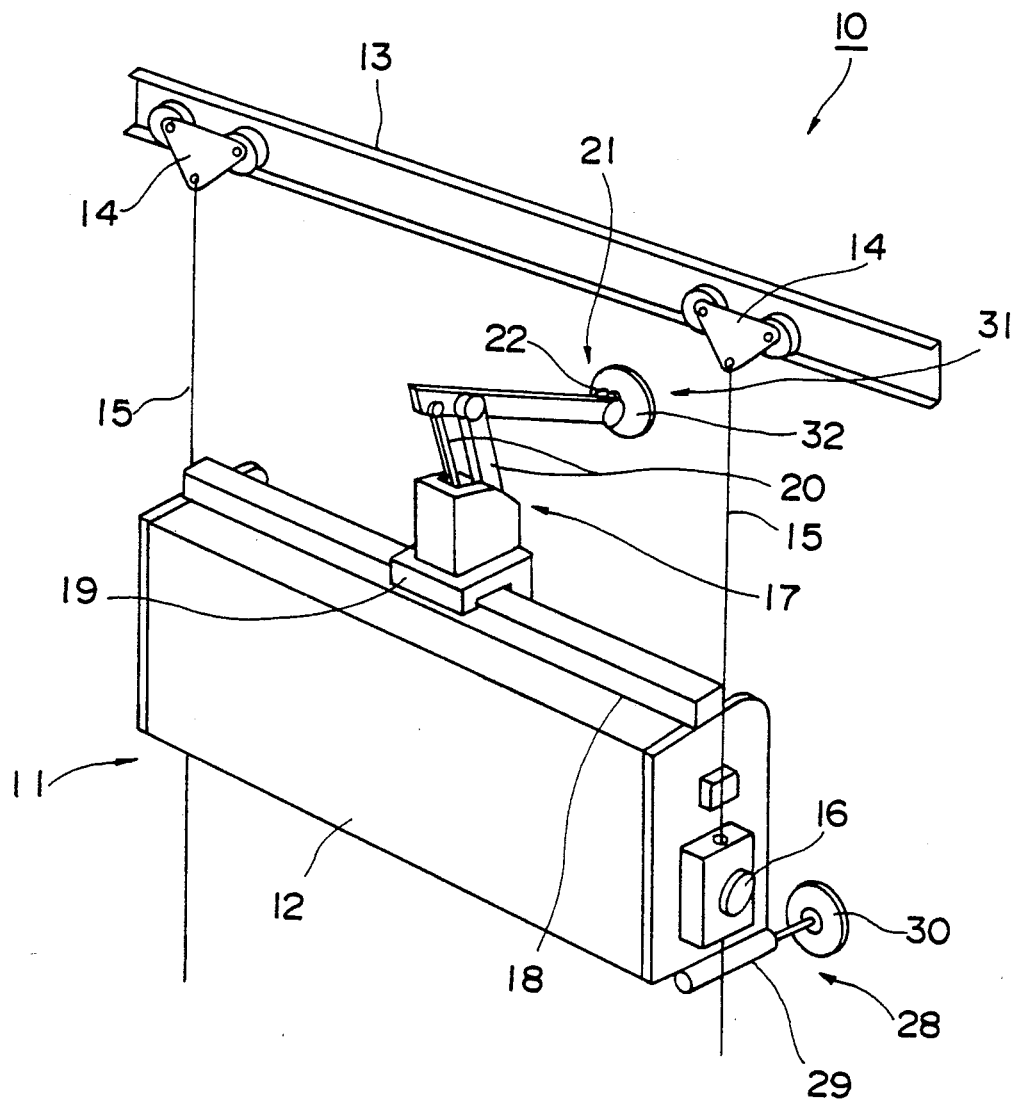
Figure 3:
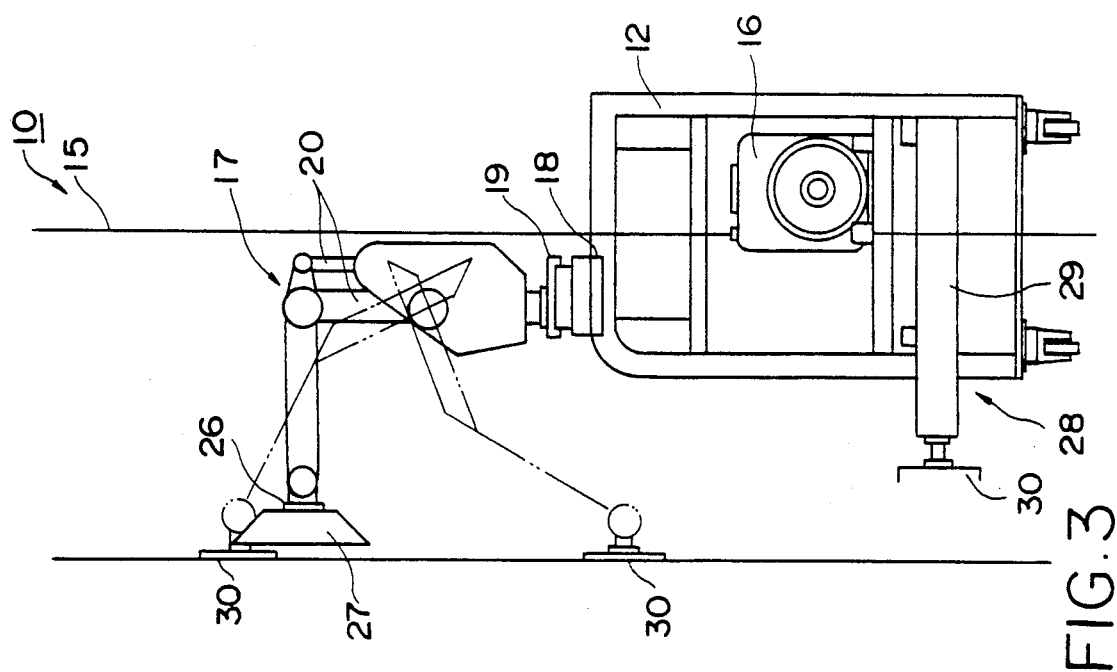
Figure 2:
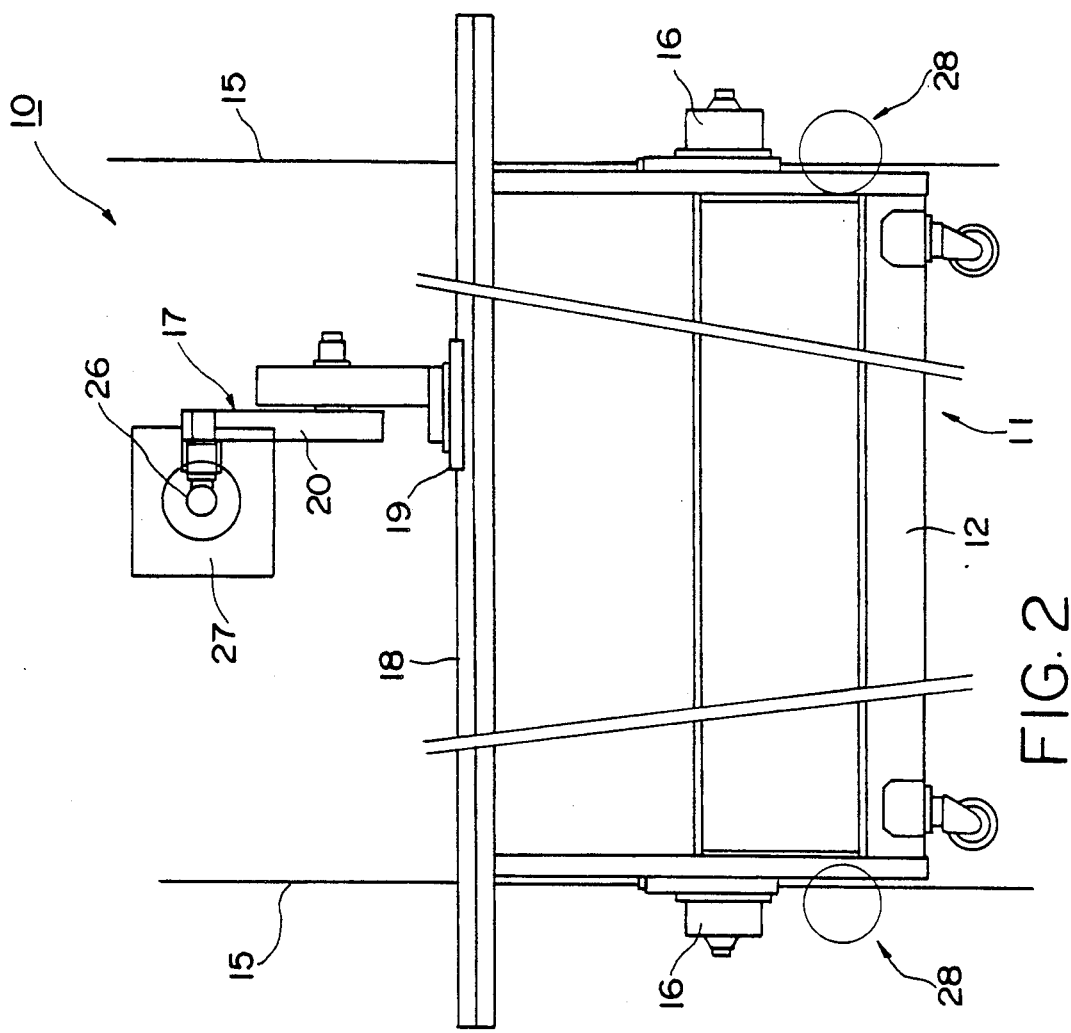
Figure 4:
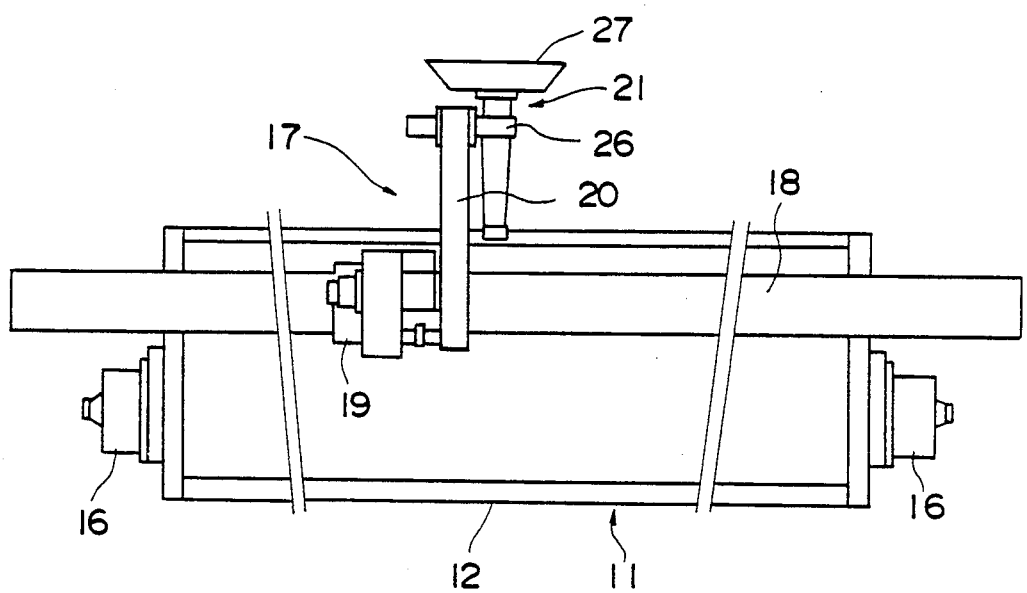

An embodiment of the invention will now be described with reference to the accompanying drawings.

Referring to FIGS. 1 through 5, a robot 10 for a work on a wall surface has a main module 11 which consists of a moving scaffold or gondola 12 having a horizontal moving mechanism and being capable of moving to a desired location on an outer wall surface of an architectural structure.

A rail support (not shown) is mounted on a rotary support (not shown) fixed to a parapet on a roof of a building and a provisional horizontal rail 13 is secured to this rail support. A pair of horizontally moving trolleys 14 are slidably mounted on this provisional horizontal rail 13. The moving scaffold 12 is hung from the pair of trolleys 14 by means of a pair of wire ropes 15.

The horizontal movement of the moving scaffold 12 is made by drive motors (not shown) provided in the horizontally moving trolleys 14 whereas the vertical movement of the moving scaffold 12 is made by a pair of endless winders 16 mounted on the moving scaffold 12.

On the moving scaffold 12 which constitutes the main module 11 is mounted an arm module 17 having three degrees of freedom in such a manner that the arm module 17 can slide to a desired location on the moving scaffold 12.

A horizontal slide base 18 is provided along substantially the entire width of the moving scaffold 12 and a slide table 19 is mounted slidably on this slide base 18. An arm 20 in the form of a parallel link arm is mounted on the slide table 19 in a plane normal to the direction of the horizontal movement of the slide table 19. The foremost end of the arm 20 can be moved toward and away from the wall surface and also can be moved in a vertical direction. Thus, the foremost end portion of the arm 20 can be moved to any desired location on the wall surface above the moving scaffold 12. Driving of three axes of the arm module 17 is made by an unillustrated servo motor for the arm.

To the foremost end portion of the arm module 17 is secured a wrist module 21 for performing a work on the wall surface.

Figure 5:
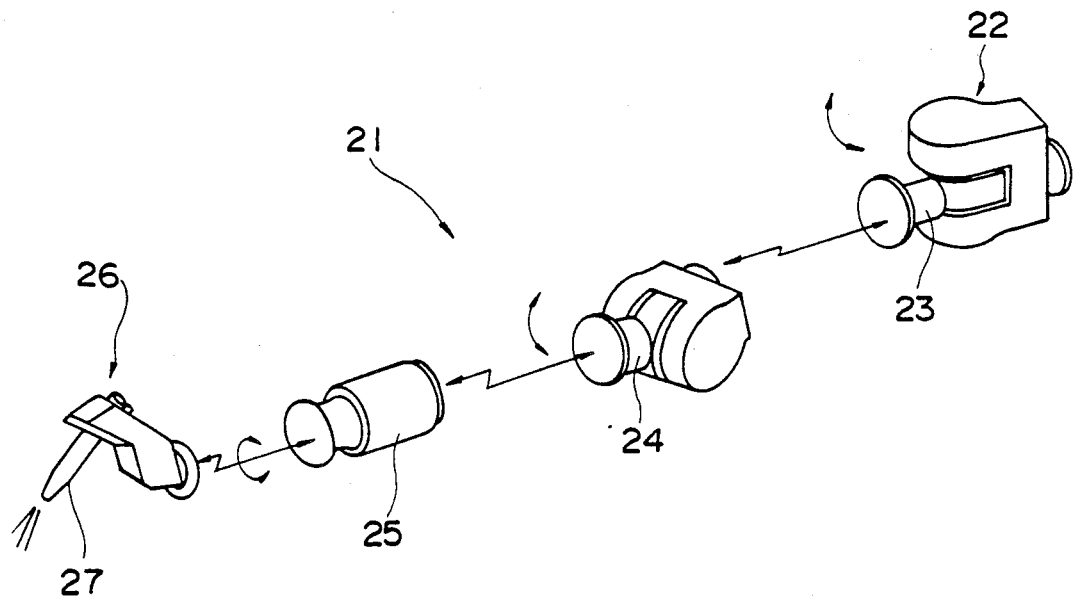

In a case, for example, where a coated film is to be removed from the wall surface, a wrist 22 as shown in FIG. 5 is used as the wrist module 21. In this case, a first rotary portion 23 which is rotatable about a vertical axis is mounted on the foremost end portion of the arm 20. A second rotary portion 24 which is rotatable about a horizontal axis is mounted on the first rotary portion 23. A third rotary portion 25 which is rotatable about the central axis of the second rotary portion 24 is mounted on the second rotary portion 24. Thus, the foremost end portion of the third rotary portion 25 can be directed to any desired directions.

A servo motor (not shown) is provided in each of these rotary portions 23, 24 and 25 to rotate each rotary portion about its axis of rotation.

To the foremost end portion of the wrist module 21 is attached an automatic tool changer 26 which is known per se. A water jet nozzle 27 is detachably mounted on the foremost end portion of the wrist module 21 through the automatic tool changer 26. By spraying water under high pressure over the coated film through the water jet nozzle 27, the coated film can be removed from the wall surface.

In the robot 10, a pair of fixing devices 28 are provided on the sides of the moving scaffold 12 for preventing sway during a work or moving of the moving scaffold 12 which constitutes the main module 11 of the robot 10 and thereby enabling a workmen to perform his work safely.

Each fixing device 28 includes an air cylinder 29 which stretches and withdraws in the direction normal to the wall surface and a vacuum pad 30 attached to the tip of the air cylinder 29. Swaying of the moving scaffold 12 can be prevented by stretching the air cylinder 29 until the vacuum pad 30 abuts against the wall surface and then causing the vacuum pad 30 to stick to the wall surface by forming a vacuum in the vacuum pad 30.

Further, for preventing sway of the moving scaffold 12 during moving thereof from one place to another, an exchangeable fixing tool 31 is prepared as a tool attached to the wrist module 21. By attaching this exchangeable fixing tool 31 to the wrist module 21 through the automatic tool changer 26, the wrist module 21 can be utilized as a leg when the moving scaffold 12 is moved from one place to another.

This exchangeable fixing tool 31 includes a vacuum pad 32 attached to a support portion through which the fixing tool 31 is mounted on the automatic tool changer 26. The vacuum pad 32 of the fixing tool 31 is caused to stick to the wall surface by forming a vacuum in the vacuum pad 32.

Figure 6:
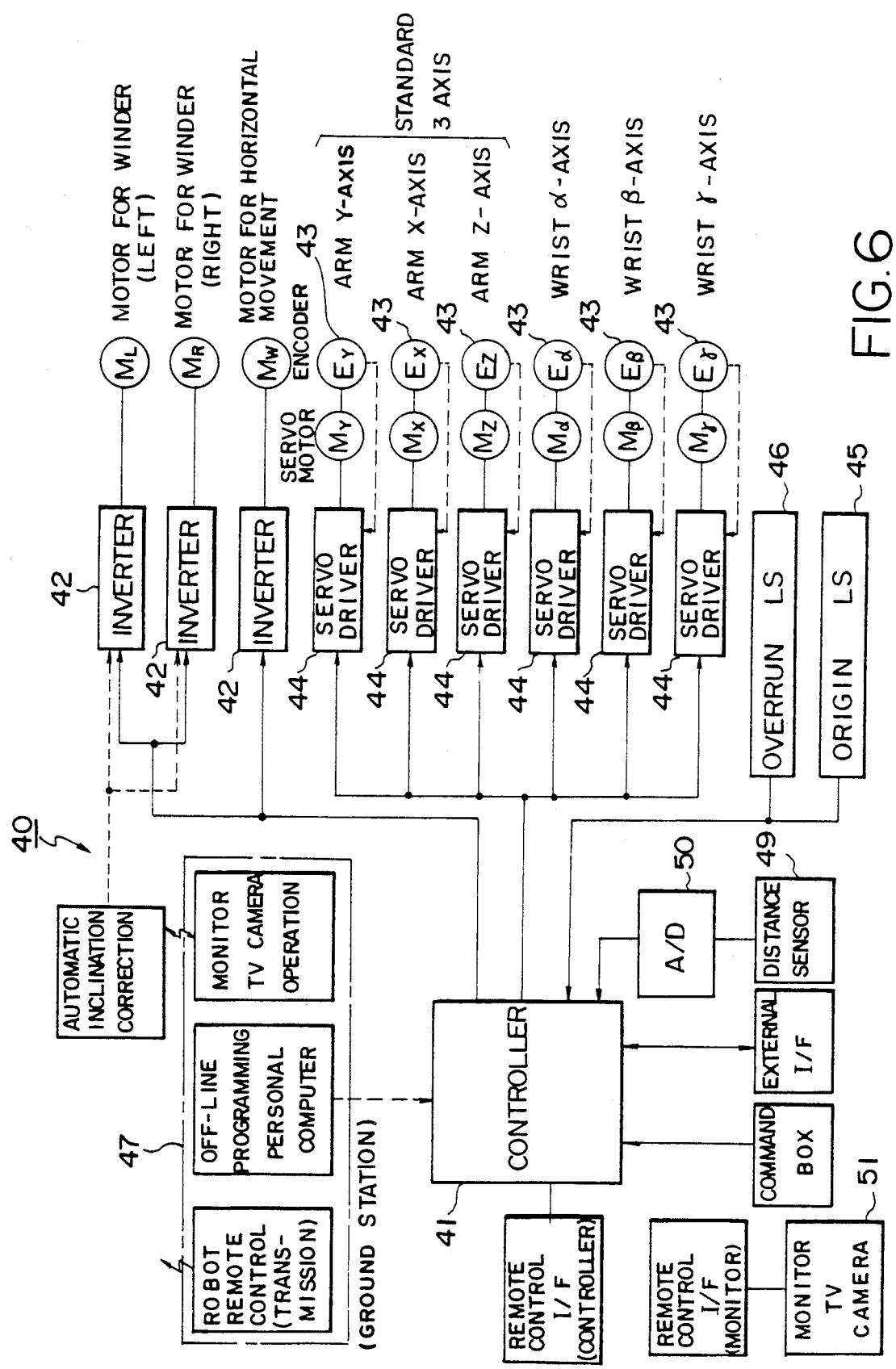
FIG. 6 is a block diagram showing a control system used for the invention.

For performing control of the robot 10, a control device 40 as shown in FIG. 6 may, for example, be employed.

This control device 40 is adapted to apply numerical control to the motors of the winders 16, the motor of the horizontal trolleys 14, the servo motor for the parallel link type arm 20 and the servo motors for the three rotary portions 23, 24 and 25 of the wrist 22. This control is performed through a controller 41.

The moving scaffold 12 constituting the main module 11 and the horizontal trolleys 14 are controlled in their speeds by inverters 42.

Encoders 43 are provided for the three servo motors of the arm 20 constituting the arm module 17 and the three servo motors of the wrist 22 constituting the wrist module 21 and a feed-back control of a semi-closed type is performed. Difference counters are used as servo drivers 44 to control the respective servo motors by pulse train inputs.

Limit switches 45 indicating origins and limit switches 46 for preventing overrunning are provided for the respective shafts controlled by the servo motors and outputs of these limit switches 45 and 46 are respectively applied to the controller 41.

A wireless control signal is transmitted to the controller 41 from a ground station 47 located on the ground and the control is made in accordance with a program which has previously been input in a personal computer 48. An outside configuration of the structure to be worked on is previously analyzed and synthesized in the form of a model on the basis of an outside design map of the structure and a program is formed on the basis of this model and input to the personal computer. The program which has been carried out is confirmed by a simulation system to facilitate the operation of the robot and enhance utility of the robot.

Various sensors necessary for the work on the wall surface may be mounted on the robot 10. For example, a distance sensor 49 is provided for maintaining the distance between the water jet nozzle 27 and the wall surface constant. A detection output of the sensor 49 is applied to the controller 41 through an analog-to-digital converter 50.

A monitor television camera 51 is mounted on the moving scaffold 12 for watching the work on the wall surface from the ground. This camera 51 can be operated by radio from the ground station 47 to confirm the conditions of the wall surface before and after the work, the initial position and the operation state of the robot 10.

The control may be made also by a remote-control made directly from the ground station 47 or may be made by issuing commands directly to the controller 41 without using the prearranged program.

The work for removing the coated film from the wall surface of the structure is performed in the following manner.

After inputting the work program previously in the personal computer 58, the horizontal rail 13 is provisionally secured to the structure and the arm module 17 and the wrist module 21 and other tools or the like necessary for the work are set on the moving scaffold 12. Thereafter the moving scaffold 12 is hung along the wall surface to be worked on by means of the wire ropes 15.

After completion of the preparation, the moving scaffold 12 is manually moved first to a predetermined work start position and then an automatic operation is started.

Upon starting of the automatic operation, the moving scaffold 12 is moved horizontally and vertically and the removal of the coated film is carried out by operations of the arm module 17 and the wrist module 21 in accordance with the prearranged program.

In order to enable the moving scaffold 12 to move horizontally in a stable state during the work on the wall surface, the fixing devices 28 and the exchangeable fixing tool 31 are employed as shown in FIG. 7.

When it has become necessary to move the moving scaffold 12, the water jet nozzle 27 is replaced by the exchangeable fixing tool 31 by using the automatic tool changer 26.

Then, this exchangeable fixing tool 31 is moved by the arm module 17 to the foremost end position on the slide base 18 in the moving direction of the moving scaffold 12 as shown in FIG 7a (the right end in the illustrated example in which the moving scaffold 12 is moved to the right). At this position, the vacuum pad 32 is operated to stick to the wall surface.

Thereafter, the slide table 19 is moved along the slide base 18 to the other end of the slide base 18 as shown in FIG 7b as the moving scaffold 12 is moved by the horizontal trolleys 14. Then, the fixing devices 28 mounted on the moving scaffold 12 are operated to cause the vacuum pads 30 to stick to the wall surface.

After the movement of the moving scaffold 12 has finished, the exchangeable fixing tool 31 is replaced by the water jet nozzle 27 and the work on the wall surface is carried out as shown in FIG. 7c. During this work on the wall surface, the moving scaffold 12 is fixed to the wall surface by the fixing devices 28 on the both sides of the moving scaffold 12 so that the work on the wall surface can be carried out in a very stable condition.

For moving the moving scaffold 12 vertically, in the same manner as in the horizontal movement, the water jet nozzle 27 is replaced by the exchangeable fixing tool 31 by using the automatic tool changer 26.

Then, the exchangeable fixing tool 31 is moved by the arm module 17 to the foremost end position on the wall surface in the direction of the movement of the moving scaffold 12 as shown in FIG. 8a (the uppermost end position in the illustrated example in which the moving scaffold 12 is moved upwardly). At this position, the vacuum pad 32 is operated to stick to the wall surface.

Thereafter, the arm 20 of the arm module 17 is moved downwardly in synchronism with the upward movement of the moving scaffold 12 as shown in FIG. 8b and, when the arm 20 has reached the lowermost position (i.e., a position at which the arm module 17 has extended to its lowermost position), the movement of the moving scaffold 12 is stopped. The fixing devices 28 on both sides of the moving scaffold 12 are operated to cause the vacuum pads 30 to stick to the wall surface.

Thus, the exchangeable fixing tool 31 is fixed to the wall surface so that the movement of the moving scaffold 12 can be made stably.

After the vertical movement of the moving scaffold 12 has finished, the exchangeable fixing tool 31 is replaced by the water jet nozzle 27 and the work on the wall surface is carried out as shown in FIG. 8c.

In the foregoing manner, the work on the wall surface can be achieved safely notwithstanding that the main module 11 is constructed of the moving scaffold 12 which is hung by the wire ropes 15 and tends to be swayed.

By having various tools such as a spray gun for spraying coating material, a roller type brush and a tool for inspecting the wall surface conditions carried in the main module as tools attached to the foremost end of the wrist module 21 and selectively using these tools, all types of works on the wall surface necessary for cleaning and repair thereof can be achieved by a single robot.

Alternatively, the arm 20 of the parallel link type of the first embodiment may be provided in a plane parallel to the wall surface and a slide base which moves toward and away from the wall surface may be provided at the foremost end of the arm 20. In any case, the construction of the arm module is not limited so long as it has one or more degrees of freedom. If, however, the parallel link type arm as shown in FIG. 1 is employed, the foremost end portion thereof can be moved in the same manner as in the arm of crossing coordinate system and, accordingly, a simple control system can be employed.

In the above described embodiments, the wrist module having three degrees of freedom has been described. However, the degree of freedom is not limited to three but a suitable degree of freedom may be selected within the range from one to three.

The main module is not limited to a moving scaffold but any other apparatus which is hung by wire ropes or the like may be used as the main module. The mechanism for moving the main module horizontally and vertically is not limited to one mounted on the main module itself.

The arm module or wrist module is not limited to one set but a plural sets of such module may be employed.

What is claimed is:

1. A robot for performing work on a wall surface comprising:
    (a) a main module hung by ropes and comprising means capable of moving said main module vertically and horizontally to a desired position on the wall surface;
    (b) an arm module mounted on the main module and being movable with one or more degrees of freedom with respect to the wall surface, said arm module comprising a slide base extending horizontally along substantially the entire width of the main module, a slide table slidably mountable on the slide base and a parallel link type arm mounted movably on the slide table; and
    (c) a wrist module mounted on a foremost end portion of the arm module and comprising an assembly including a first rotary portion rotatable about a vertical axis of the wrist module, a second rotary portion rotatable about a horizontal axis of the wrist module, and a third rotary portion rotatable about a central axis of the wrist module, and an automatic tool changer for detachably mounting a tool thereon.

2. A robot as defined in claim 1 wherein said arm module is movable with 3 degrees of freedom.

3. A robot as defined in claim 1 wherein said means capable of moving comprises fixing devices mounted on the main module for fixedly holding the main module on the wall surface and an exchangeable fixing tool detachably mounted on the automatic tool changer of the wrist module for stabilizing the main module during movement thereof, said exchangeable fixing tool comprising a support portion attached to the automatic tool changer and a vacuum pad attached to the support portion for forming a vacuum to thereby cause the vacuum pad to stick to the wall surface.

4. A robot as defined in claim 3 wherein the fixing devices mounted on the main module each comprise an air cylinder secured to a side portion of the main module and being capable of stretching and withdrawing toward and away from the wall surface and a vacuum pad attached to the tip of the air cylinder for forming a vacuum to cause the vacuum pad to stick to the wall surface.

* * * * *